Nov. 16, 1948.                    W. P. BOOTHROYD                    2,454,128
                                    ELECTRICAL SYSTEM
                                   Filed Oct. 24, 1944
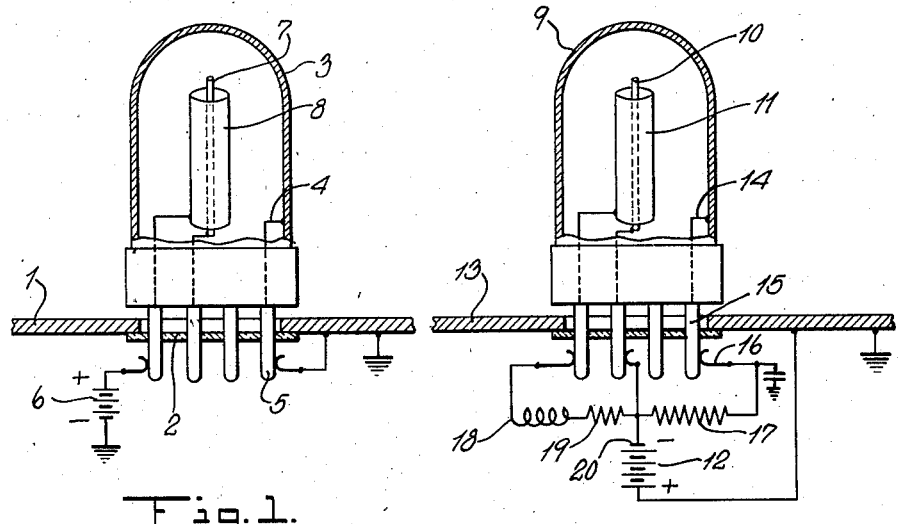
Fig. 1.                                                              Fig. 2.
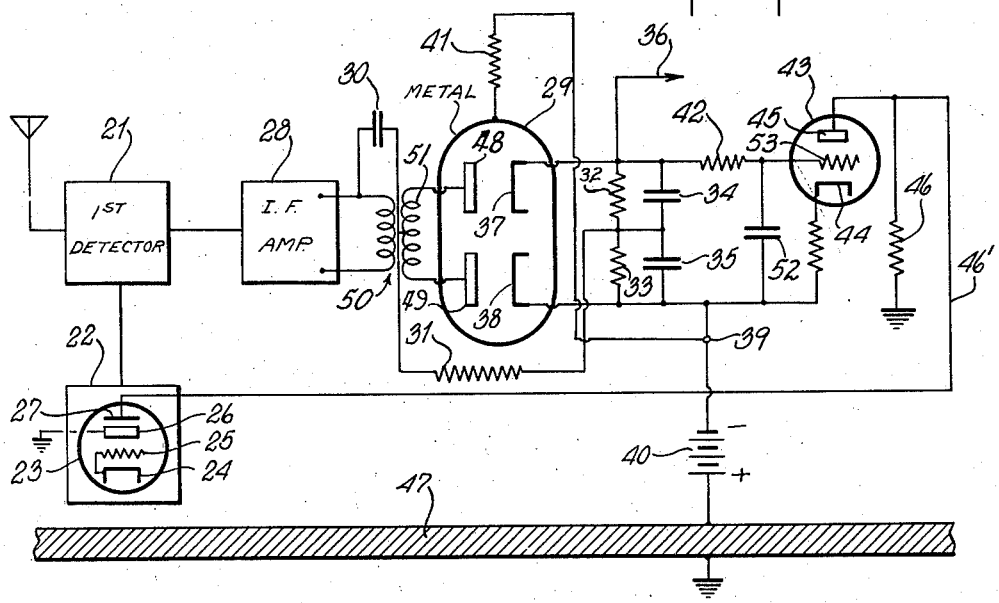
Fig. 3.
                                                                  INVENTOR
                                                         WILSON P. BOOTHROYD
                                                         BY John J. Rogan
                                                                  ATTORNEY Patented Nov. 16, 1948

2,454,128

UNITED STATES PATENT OFFICE 2,454,128

ELECTRICAL SYSTEM

Wilson P. Boothroyd, Philadelphia, Pa., assignor, by mesne assignments, to Philco Corporation, Philadelphia, Pa., a corporation of Pennsylvania Application October 24, 1944, Serial No. 560,141

6 Claims. (Cl. 250—27)

This invention relates to electronic control systems and more especially to systems employing so-called metal tubes, and in particular to such systems wherein the negative electrodes are operated at a relatively high negative potential with respect to ground.

In certain kinds of electronic equipment, it is desirable to operate one or more of the electronic tube elements at comparatively high negative potential relative to ground, and still to retain the advantages of mounting the component parts of the equipment on the usual grounded metal chassis. However, this desirable arrangement possesses certain disadvantages which are, first, the disturbance of the electrical characteristics of parts of the system when a person accidentally touches one of the metal tubes. Second, the possibility of dangerous shock should the metal tube be accidentally touched.

Accordingly, it is a principal object of this invention to provide an electronic device employing one or more metal tubes in conjunction with a grounded chassis and a low impedance negative potential power supply, wherein the accidental touching of a metal tube will not materially disturb the proper operation of the device, and wherein the danger of electric shock is considerably minimized.

In so-called metal tubes, the tube elements are enclosed within a metal bulb which is evacuated and usually connected to a special grounding pin whereby the metal bulb can be directly connected to the metal chassis on which the tube and other components are supported. In such conventional uses of the metal tube, there is hardly any danger of electric shock in touching the tube because the metal bulb is effectively at ground potential and the elements of the tube which are at high positive potential are protected by the metal bulb. Accordingly, in such conventional circuits, it is customary to ground the negative terminal of the high potential power supply. Because of these facts, the touching of the metal bulb does not disturb the electrical conditions of the system wherein the tube is used. However, in certain special applications, instead of grounding the cathode and operating another electrode, e. g., the plate, at a high positive potential, it is desirable to reverse the arrangement, that is the cathode or negative electrode is connected to the terminal of the power supply which is at high negative potential with respect to ground, and the plate or other positive electrode is then connected to ground, it being understood that the positive terminal of the power supply is also grounded. It is clear therefore, that if the conventional metal tube arrangement were utilized wherein the metal shell or bulb is connected directly to a grounding pin, the metal shell would be at substantially the same potential level with respect to ground as is the plate, so far as the cathode is concerned. Consequently, there would be considerable electron flow from the cathode to the metal shell which electron flow does not perform any useful function in the circuit. If the power supply is of very low internal impedance, and the ground connection should be accidentally broken, there results a considerable change in the electrical conditions of the circuit if the metal bulb is accidentally touched. Furthermore, under such conditions such touching may result in one receiving a shock at a potential approximating the total potential of the power supply.

Accordingly, it is another principal object of this invention to provide a metal bulb electron tube with special connections between the metal shell and one of the tube prongs whereby the above-noted and other disadvantages are overcome.

A feature of the invention relates to an improved system employing metal bulb electron tubes having the cathode operated at a relatively high negative potential with respect to ground.

Another feature relates to a signalling system employing an improved frequency discriminator circuit.

A still further feature relates to the novel organization, arrangement and relative interconnection of parts which cooperate to produce an improved signalling device employing one or more metal bulb electron tubes.

Other features and advantages not specifically enumerated will be apparent after a consideration of the following detailed descriptions and the appended claims.

In the drawing,

Fig. 1 represents in diagrammatic form the known prior way of connecting a metal bulb electron tube in circuit.

Fig. 2 is a diagrammatic view showing the manner of connecting a metal bulb electron tube in circuit according to the invention.

Fig. 3 is an illustrative application of Fig. 2 embodied in an improved frequency discriminator arrangement for a radio receiver of the superheterodyne type.

Referring to Fig. 1, there is illustrated the conventional way of using a metal bulb electron tube wherein the tube is supported on the grounded metal chassis I, through the intermediary of a suitable receptacle or socket 2, fastened to the chassis. The metal bulb 3 is usually connected by a lead wire 4, to a grounding pin 5, carried by the tube base, so that when the tube is plugged into the socket the bulb 3 is directly grounded to chassis 1. In this conventional arrangement, the power supply, represented schematically by the battery 6, has its negative terminal at ground potential and the cathode 7 or other negative electrode of the tube is connected to ground, or in some cases slightly above ground potential. In certain types of electronic equipment, it is desirable to operate the cathode 7 at a relatively high negative potential with respect to ground, and to have the positive electrode, for example the plate 8, at ground potential. It is clear that the prior arrangement such as shown in Fig. 1 cannot be used for this purpose.

Referring to Fig. 2, there is shown in generalized schematic form the manner in which a metal tube can be operated with the cathode at high negative potential with respect to ground and without the above-noted disadvantages. Merely for explanatory purposes, the metal tube 9 is shown as a diode comprising a negative electrode or cathode 10 and a positive electrode or plate 11. Usually in such tubes, the cathode is not entirely enclosed within the plate electrode and there always exists a path for stray electrons to flow between the cathode and the metal bulb 9. In the prior use of such tubes as illustrated in Fig. 1, the bulb, being at ground potential, did not exert any appreciable attractive force on these stray electrons, and therefore the problem of electron emission to the bulb was negligible. On the contrary, when there is a high positive potential gradient between the bulb and the cathode, any accidental touching or grounding of the bulb will change the electron distribution within the tube and will affect the electrical parameters of the external circuit components connected thereto. In accordance with the present invention, the cathode 10 is connected to the negative terminal of the power supply 12 which is schematically represented in the drawing as a battery, but any other well-known source of high D. C. potential may be employed. In accordance with the invention also, the positive terminal of this source 12 is directly grounded and the chassis 13 which supports the tube 9 is also directly grounded.

The metal bulb 9 is connected by the lead wire 14 to one of the tube plug-in prongs 15. The socket contact 16 which cooperates with prong 15 is connected through a high resistance 17 of the order of 1.5 megohms to the cathode 10, thus maintaining the bulb 9 at substantially the same D. C. potential as the cathode, namely a high negative potential with respect to ground. The signal or load circuit represented generically by the coil 18 and resistance 19, is then connected between the negative terminal of the source 12 and the plate 11 as shown in Fig. 2. With this arrangement, all the elements in the tube 10 are, so far as D. C. potential is concerned, at the same level with respect to ground, namely, the negative potential of point 20.

Therefore, any accidental touching of the bulb 9 or any high resistance connection from the bulb 9 to ground will not disturb the electron distribution within the tube, and furthermore the maximum current that could flow through any such accidental grounding connection would be definitely limited by the IR drop through the resistance 17. Consequently, if one accidentally touches the metal bulb and the chassis 13, the maximum voltage can be proportioned so as to be below any dangerous limit. For example, assuming a body resistance of 250,000 ohms, the resistance 17 may be of 1.5 megohms in which event the maximum shock would be about 80 volts and less than 3 milliamperes, even though a D. C. supply source is of 500 volts. I have found that this arrangement while limiting the maximum shock voltage, does not impair the operation of the circuit elements connected to the tube.

This last-mentioned feature is of particular importance in certain kinds of electronic equipment where circuit elements must be operated at a high negative potential with respect to ground. Merely as an illustration, there is shown in Fig. 3 a superheterodyne receiving system employing a frequency discriminator network which embodies the improvements of Fig. 2.

Referring to Fig. 3, the superheterodyne receiving system comprises the usual first detector 21, which is supplied with heterodyne oscillations from the local oscillator 22. In one kind of local oscillator that has been found to be satisfactory, the oscillator employs an electron tube 23 comprising an electron-emitting cathode 24, a control grid 25, a resonant cavity 26, and an electron repelling electrode 27. In accordance with the well-known operation of this type of tube, the frequency of the generated oscillations can be controlled by changing the negative potential on the electrode 27; as a typical example a tube of the type 2K28 may be employed for this purpose.

In accordance with conventional practice, the first detector 21 is connected to an intermediate frequency amplifier 28. If the original signals are in the form of frequency modulations, the amplifier 28 feeds a frequency discriminator comprising a double diode rectifier 29 of the metal bulb type. This double diode has its anodes 48, 49 connected in push-pull relation to the I. F. amplifier through coupling transformer 50 and the rectified signals are applied through a discriminator network including in addition to the diode rectifier the capacitor 30, resistance 31, and the audio frequency load resistors 32, 33, which are by-passed by the condensers 34, 35. It will be noted that the capacitor 30 and one end of the resistance 31 are connected in divided balanced relation to the secondary winding 51 of the I. F. coupling transformer, and the audio frequency output of the discriminator is taken off at the point 36. In accordance with the present invention, the cathodes 37, 38, of the double diode are connected to the negative terminal 39 of the D. C. power supply 40, the positive terminal of which is directly grounded as is the metal chassis on which the parts are mounted. Likewise, in accordance with the present invention, the metal bulb 29 is connected through a high resistance 41 of the order of 1.5 megohms to the negative terminal 39 of the power supply.

For controlling the frequency of the local oscillator 22, a portion of the D. C. signal from the discriminator is applied through the resistance 42 to the control grid of an amplifier tube 43, the cathode 44 of which is connected to the negative terminal 39 of the power supply, and the plate 45 being connected through the load resistor 46 to the grounded positive terminal of that supply. An alternating current by-pass condenser 52 of approximately 0.1 mfd. is connected across the control grid 53 and the cathode 44. The varying potentials at the plate 45 are applied over the AVC conductor 48 to the electrode 27 to control the frequency of the local oscillator. With this particular circuit connection any accidental high resistance groundings to the bulb 29 do not affect the discriminator and therefore do not disturb the stability of the local oscillator. Furthermore, the danger of electric shock by touching the bulb 29 can be maintained below a definite upper limit.

While certain specific embodiments have been disclosed herein, it will be understood that this has been done merely for explanatory purposes and not by way of limitation, and that various changes and modifications may be made in the disclosed embodiments without departing from the spirit and scope of the invention.

What I claim is:

1. In an electronic tube system of the type employing at least one electron tube with a metal bulb which encloses the tube electrodes, said tube having a main electron path between a negative electrode and a positive electrode within the bulb, and a stray electron path between the negative electrode and said bulb, direct current potential supply means to maintain the negative electrode at a high negative potential with respect to ground, and a high resistance connected between said bulb and the negative terminal of said supply whereby the number of stray electrons tending to reach said bulb from the negative electrode is substantially reduced.

2. An electronic tube system according to claim 1 in which said supply circuit is of low impedance and said resistance is of a high value to limit the current through any accidental external ground connections to said bulb.

3. In a system of the character described, a grounded supporting chassis, a metal bulb electron tube supported on said chassis, a high potential direct current supply source having its positive terminal substantially directly grounded, a substantially direct connection from the negative terminal of said source to the cathode of said tube, and a high resistance connected between said bulb and said negative terminal.

4. A system according to claim 3 in which said supply source is of low internal impedance and said resistance is of the order of 1.5 megohms.

5. In an electronic tube system of the type employing at least one electron tube with a conductive enclosing envelope, direct current power supply means to maintain the cathode of said tube at a high negative potential with respect to ground, and means for normally maintaining said conductive envelope at substantially the same direct current potential as said cathode, the last-mentioned means comprising a high resistance conductively connected between said cathode and said conductive envelope.

6. In an electronic tube system of the type employing at least one electron tube with a metal bulb which encloses the tube electrodes, one of said electrodes being arranged to operate as a negative electrode with respect to another electrode, a source of direct current power supply for said tube, means for directly grounding the positive terminal of said supply, means connecting said negative electrode to the negative terminal of said power supply source, and a resistance conductively connected between said negative electrode and said bulb for normally maintaining said bulb at substantially the same direct current potential as said negative electrode.

WILSON P. BOOTHROYD.

REFERENCES CITED

The following references are of record in the file of this patent:

UNITED STATES PATENTS

| Number | Name | Date |
|---|---|---|
| 2,137,355 | Schlesinger | Nov. 22, 1938 |
| 2,282,101 | Tunick | May 5, 1942 |
| 2,367,352 | Holst et al. | Jan. 16, 1945 |
| 2,369,055 | Lange | Nov. 22, 1938 |